United States Patent [19]

Liet et al.

[11] 4,188,759
[45] Feb. 19, 1980

[54] SHEET FOR CONSTRUCTING THE WALL OF A SUBSTANTIALLY CYLINDRICAL SILO; AS WELL AS SUBSTANTIALLY CYLINDRICAL SILO

[75] Inventors: Fredericus Liet; Cornelis H. Liet, both of Losser, Netherlands

[73] Assignee: Trioliet-Mullos Silo Nederland B.V., Losser, Netherlands

[21] Appl. No.: 11,654

[22] Filed: Feb. 12, 1979

Related U.S. Application Data

[60] Continuation-in-part of Ser. No. 845,713, Oct. 26, 1977, abandoned, which is a division of Ser. No. 597,510, Jul. 21, 1975, Pat. No. 4,057,295.

[30] Foreign Application Priority Data

Jul. 22, 1974 [NL] Netherlands ......................... 7409901

[51] Int. Cl.² .......................... E04B 1/32; E04G 11/04; E04C 1/10
[52] U.S. Cl. ....................................... 52/245; 52/192; 52/247; 52/542; 52/584
[58] Field of Search ................. 52/192, 245, 246, 247, 52/248, 193, 194, 195, 196, 197, 584, 588, 542; 214/17 R

[56] References Cited

U.S. PATENT DOCUMENTS

| 832,290 | 10/1906 | Brown | 52/246 |
|---|---|---|---|
| 1,100,081 | 6/1914 | Kramer | 52/196 |
| 1,125,070 | 1/1915 | Daviee | 52/584 |
| 1,147,378 | 7/1915 | Cronkhite | 52/588 |
| 1,184,385 | 5/1916 | Schlafly | 52/195 |
| 1,265,966 | 5/1918 | Schlafly | 52/245 |
| 1,778,606 | 10/1930 | Proctor | 52/248 |
| 2,729,313 | 1/1956 | Ernestus | 52/246 |
| 2,953,276 | 9/1960 | Dunn | 52/584 X |
| 3,340,658 | 9/1967 | Dueringer | 52/246 |

FOREIGN PATENT DOCUMENTS

| 495761 | 9/1953 | Canada | 52/194 |
|---|---|---|---|
| 621699 | 5/1927 | France | 52/245 |
| 50543 | 12/1940 | France | 52/245 |
| 295609 | 4/1932 | Italy | 52/245 |
| 664405 | 1/1952 | United Kingdom | 52/245 |

*Primary Examiner*—Leslie Braun
*Attorney, Agent, or Firm*—John P. Snyder

[57] ABSTRACT

A sheet for constructing the wall of a substantially cylindrical silo. This sheet has a substantially rectangular periphery and is slightly cylindrically curved according to the radius of the wall of the silo to be constructed. The sheet comprises first and second straight edges opposite one another and first and second curved edges also opposite one another. The sheet is provided with rows of bolt holes adjacent the four edges. The first straight edge and the first curved edge are provided with a flange, both flanges being positioned at the same side of the sheet and extending approximately perpendicularly to the sheet surface, the second straight edge and the second curved edge having no flange. The flange on the first straight edge ends at a distance from the second curved edge.

24 Claims, 10 Drawing Figures

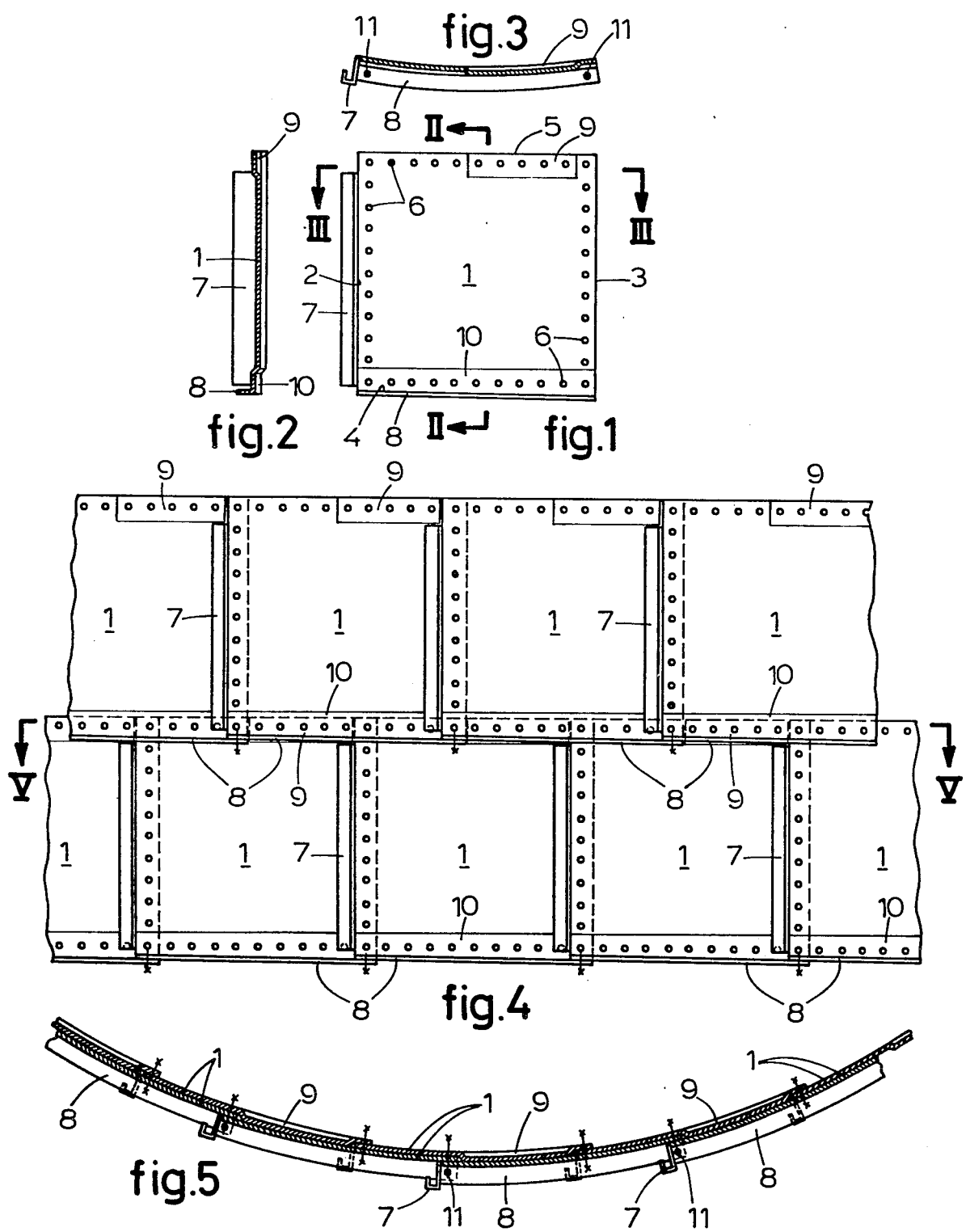

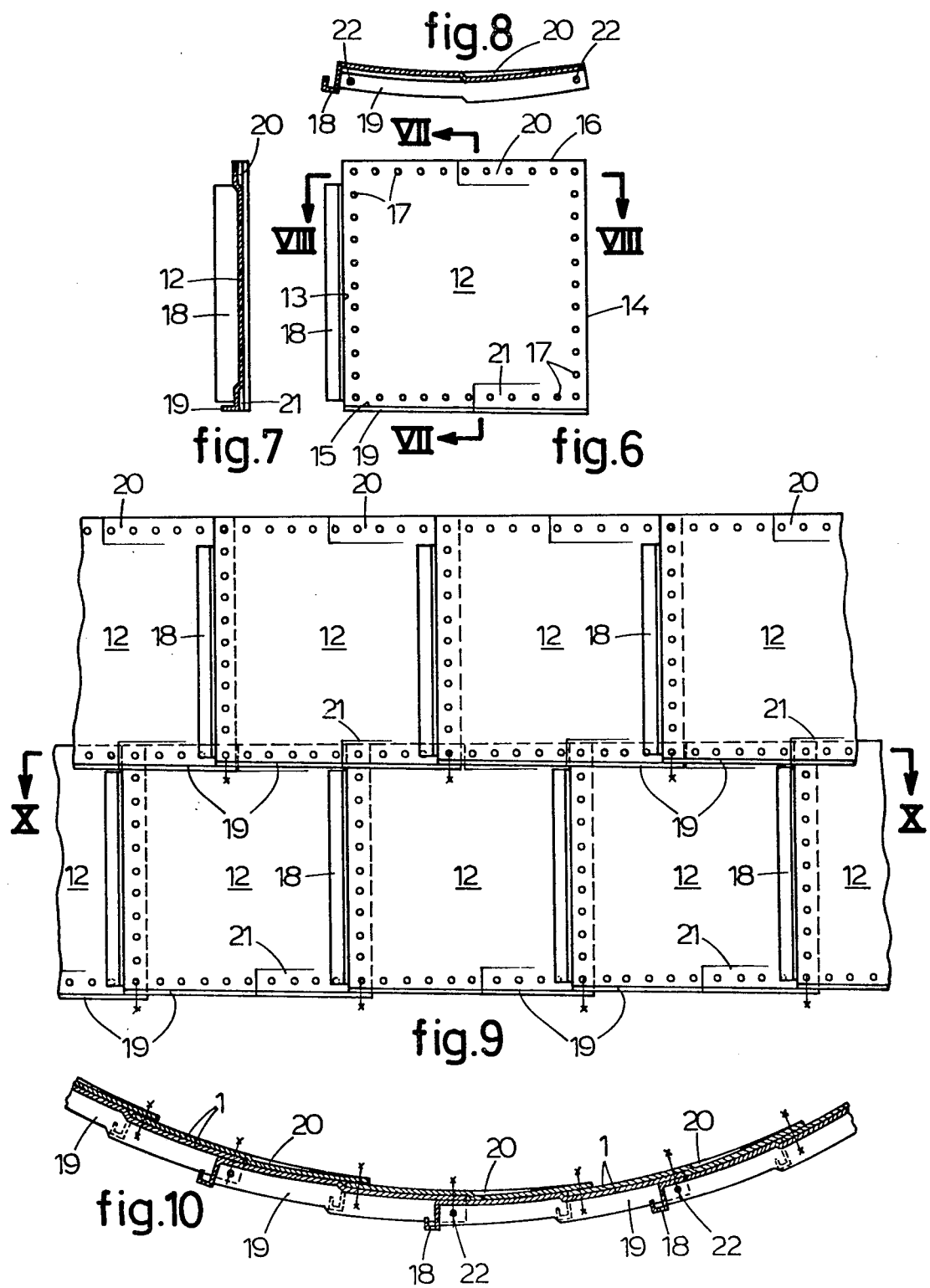

SHEET FOR CONSTRUCTING THE WALL OF A SUBSTANTIALLY CYLINDRICAL SILO; AS WELL AS SUBSTANTIALLY CYLINDRICAL SILO

This application is a continuation-in-part of copending application Ser. No. 845,713 filed Oct. 26, 1977, now abandon, which is a division of Ser. No. 597,510 filed July 21, 1975, now U.S. Pat. No. 4,057,295 of Nov. 8, 1977.

BACKGROUND OF THE INVENTION

The invention relates to a sheet for constructing the wall of a substantially cylindrical silo; as well as to a substantially cylindrical silo.

Hitherto it has been common practice to provide these sheets on four sides with flanges which have holes for the relative fastening by means of bolts or rivets. The flanges serve at the same time for stiffening the silo.

In order to avoid that due to tangential forces produced in the cylindrical wall the vertical flanges bend to near the bolt holes, with the known silos these flanges have been stiffened by rugged strips on either side thereof.

SUMMARY OF THE INVENTION

It is an object of the invention to provide a sheet wherein the use of these strips may be omitted, which involves not only an important saving of material, but also a considerable reduction of weight of the entire silo.

It is a further object of the invention to provide a sheet which is designed in such manner that the wall of a substantially cylindrical silo which is constructed by means of these sheets may be sealed between adjacent sheets in an excellent manner without the use of large quantities of sealing material.

It is still a further object of the invention to provide a substantially cylindrical silo having a wall which is constructed by means of these sheets and which is very rigid both in the horizontal and in the vertical direction.

BRIEF DESCRIPTION OF THE DRAWINGS

FIG. 1 is an elevational view of a first embodiment of the sheet according to the invention for constructing the wall of a substantially cylindrical silo.

FIG. 2 is a section along the line II—II in FIG. 1.

FIG. 3 is a section along the line III—III in FIG. 1.

FIG. 4 is a developed view of a plurality of assembled sheets according to FIG. 1.

FIG. 5 is a section along the line V—V in FIG. 1.

FIG. 6 is an elevational view of a second embodiment of the sheet according to the invention for constructing the wall of a substantially cylindrical silo.

FIG. 7 is a section along the line VII—VII in FIG. 6.

FIG. 8 is a section along the line VIII—VIII in FIG. 6.

FIG. 9 is a developed view of a plurality of assembled sheets according to FIG. 6.

FIG. 10 is a section along the line X—X in FIG. 9.

DESCRIPTION OF PREFERRED EMBODIMENTS

FIGS. 1-3 show a first embodiment of the sheet 1 according to the invention for constructing the wall of a substantially cylindrical silo. This sheet 1 has a substantially rectangular periphery and is slightly cylindrically curved according to the radius of the wall of the silo to be constructed.

The sheet 1 has a first straight edge 2 and a second straight edge 3 which are positioned opposite one another, while the sheet 1 is further provided with a first curved edge 4 and a second curved edge 5 which are also positioned opposite one another.

The sheet 1 is provided with rows of bolt holes 6 adjacent the four edge 2, 3, 4 and 5.

The first straight edge 2 and the first curved edge 4 are each provided with a flange 7 and 8 respectively, which extend approximately perpendicular to the sheet surface and which have the object to give the necessary rigidity to the sheet 1. Both flanges 7 and 8 lie at the same side of the sheet 1. The second straight edge 3 and the second curved edge 5 are not provided with a flange.

The flange 7 on the first straight side 2 ends at one end at a distance from the second curved edge 5 and at the opposite end at a short distance from the first curved edge 4.

A substantially rectangular edge area 9 adjacent the second curved edge 5 is offset with respect to the adjacent portion of the sheet 1 over a distance corresponding approximately to the thickness of the sheet material. This offset edge area 9 begins at a distance from the end of the second curved edge 5 joining the second straight edge 3, while this edge area 9 ends at a distance from the opposite end of the second curved edge 5.

The offset edge area 9 may end approximately at the middle of the second curved edge 5. As an alternative this offset edge area 9 may also end before or past the middle of the second curved edge 5.

The edge area 9 is offset towards the side of the sheet 1 where the flanges 7, 8 extend.

A second substantially rectangular edge area 10 adjacent the first curved edge 4 extends along the whole length of the first curved edge 4 and is offset with respect to the adjacent portion of the sheet 1 in the same direction as the offset edge area 9.

The flange 8 on the first curved edge 4 is provided with one or more bolt holes 11 near both its ends.

The flange 7 on the first straight edge 2 is first bent outwardly approximately at right angles and is thereafter bent rearwardly approximately at right angles in order to improve the rigidity of this flange 7 and thus to increase the rigidity of the sheet 1.

Further, the first curved edge 4 diverges with respect to the row of bolt holes 6 adjacent the second curved edge 5 to such extent, that the distance between them at the second straight edge 3 is larger by the thickness of the sheet material than at the first straight edge 2. In this manner it is possible that a plurality of sheets 1 according to FIGS. 1-3 is assembled in the manner shown in FIGS. 4 and 5, wherein the flanges 8 are arranged in roof-tile fashion (FIG. 5).

The rows of bolt holes 6 adjacent the opposite straight edges 2 and 3 diverge to an extent that with a number of sheets 1 assembled in a ring the inner diameter on one side of the ring is equal to the outer diameter on the other side thereof.

The sheets 1 are arranged in the wall of the silo in horizontal rings positioned one above the other. With adjacent sheets 1 in each ring the first straight edge 2 of the one sheet 1 overlaps the second straight edge 3 of the adjacent sheet 1 to an extent that the rows of bolt holes 6 adjacent these edges 2, 3 are aligned with each other, so that bolts or the like connection means may be mounted therethrough.

With sheets 1 of successive rings the first curved edge 4 of the one sheet 1 overlaps the second curved edge 5 of the adjacent sheet 1 to such extent that the rows of bolt holes 6 adjacent these edges 4, 5 are aligned with each other and may be used for mounting bolts or the like connecting means.

Further, bolt holes 11 of adjacent sheets 1 will be aligned and may be used for mounting bolts or the like connecting means.

FIGS. 6–8 show a modified embodiment of the sheet.

This sheet 12 again has a substantially rectangular periphery and is slightly cylindrically curved according to the radius of the wall of the silo to be constructed.

Thus this sheet 12 has a first straight edge 13 and a second straight edge 14 which are positioned opposite one another, while the sheet 12 is further provided with a first curved edge 15 and a second curved edge 16, which are also positioned opposite one another.

Again this sheet 12 is provided with rows of bolt holes 17 adjacent the four edges 13, 14, 15, 16.

The first straight edge 13 and the first curved edge 15 are each provided with a flange 18 and 19 respectively, which flanges 18, 19 are positioned at the same side of the sheet 12 and extend approximately perpendicular to the sheet surface. The second straight edge 14 and the second curved edge 16 do not have a flange.

The flange 18 on the first straight edge 13 ends at one end at a distance from the second curved edge 16 and at the opposite end at a short distance from the first curved edge 15.

A substantially rectangular edge area 20 adjacent the second curved edge 16 begins at the end of the second curved edge 16 joining the second straight edge 14 and ends at a distance from the opposite end of the second curved edge 16. This edge area 20 is progressively offset from its beginning to its end with respect to the adjacent portion of the sheet 12. The maximum distance over which this edge area 20 is offset corresponds approximately to the thickness of the sheet material.

A second substantially rectangular edge area 21 adjacent the first curved edge 15 begins at the end of the first curved edge 15 joining the second straight edge 14 and ends at a distance from the opposite end of the first curved edge 15. This second edge area 21 is also progressively offset from its beginning to its end with respect to the adjacent portion of the sheet 12. The maximum distance over which this second edge area is offset corresponds approximately to the thickness of the sheet material.

Both offset edge areas 20 and 21 are offset in the same direction, which in the embodiment according to FIGS. 6–8 is towards the side of the sheet 1, where the flanges 18 and 19 extend.

The offset edge areas 20, 21 may end approximately at the middle of the adjacent curved edge 16 and 15 respectively. However, as an alternative it is also possible that at least one of both offset edge areas 20, 21 ends before or past the middle of the adjacent curved edge 16 or 15.

As shown in FIG. 8 the flange 19 on the first curved edge 15 is provided with one or more bolt holes 22 near both its ends.

The flange 18 on the straight edge 13 is first bent outwardly approximately at right angles and is thereafter bent rearwardly approximately at right angles in order to improve the rigidity of this flange 18 and thus to increase the rigidity of the sheet 12.

Again the first curved edge 15 diverges with respect to the row of bolt holes 17 adjacent the second curved edge 16 to such extent that the distance between them at the second straight edge 14 is larger by the thickness of the sheet material than at the first straight edge 13. In this manner it is again possible that a plurality of sheets 12 according to FIGS. 6–8 is assembled in the manner shown in FIGS. 9 and 10, wherein the flanges 19 are arranged in roof-tile fashion (FIG. 10).

The rows of bolt holes 17 adjacent the opposite straight edges 13 and 14 diverge to an extent that with a number of sheets 12 assembled in a ring the inner diameter on one side of the ring is equal to the outer diameter on the other side thereof.

The sheets 12 are arranged in the wall of the silo in horizontal rings positioned one above the other. With adjacent sheets 12 in each ring the first straight edge 13 of the one sheet 12 overlaps the second straight edge 14 of the adjacent sheet 12 to an extent that the rows of bolt holes 17 adjacent these edges 13, 14 are aligned with each other, so that bolts or the like connecting means may be mounted therethrough.

With sheets 12 of successive rings the first curved edge 15 of the one sheet 12 overlaps the second curved edge 16 of the adjacent sheet 12 to an extent that the rows of bolt holes 17 adjacent these edges 15, 16 are aligned with each other, so that bolts or the like connecting means may be mounted therethrough.

Further bolt holes 22 of adjacent sheets 12 are aligned and may be used for mounting bolts or the like connecting means therethrough.

The invention is not limited to the embodiments shown in the drawings by way of example, which may be varied in different ways within the scope of the appended claims.

We claim:

1. A substantially cylindrical silo having a wall which is constructed from a plurality of sheets, each sheet having a substantially rectangular periphery and being slightly cylindrically curved, each sheet comprising first and second straight edges opposite one another and first and second curved edges also opposite one another, each sheet being provided with rows of bolt holes adjacent the four edges, the first straight edge and the first curved edge being provided with a flange, both flanges being positioned at the same side of the sheet and extending approximately perpendicularly to the sheet surface, the second straight edge and the second curved edge having no flange, the flange on the first straight edge ending at a distance from the second curved edge, a substantially rectangular edge area adjacent this second curved edge being offset with respect to the adjacent portion of the sheet over a distance corresponding approximately to the thickness of the sheet, said offset edge area beginning at a distance from the end of the second curved edge joining the second straight edge, while this edge area ends at a distance from the opposite end of the second curved edge, a second substantially rectangular edge area adjacent the first curved edge extending along the whole length of this first curved edge and being offset in the same direction as the first mentioned offset edge area over a distance corresponding approximately to the thickness of the sheet, the flange on the first straight edge ending at a short distance from the first curved edge and the flange on the first curved edge being provided with bolt holes near both its ends, the sheets being arranged in horizontal rings positioned one above the other, the first straight edge of one sheet overlapping the second straight edge of the adjacent sheet in each ring, while in successive rings the first curved edge of one sheet overlaps the second curved edge of the adjacent sheet.

2. A sheet for constructing the wall of a substantially cylindrical silo, which sheet has a substantially rectangular periphery and is slightly cylindrically curved, the sheet comprising first and second straight edges opposite one another and first and second curved edges also opposite one another, the sheet being provided with rows of bolt holes adajcent the four edges, the first straight edge and the first curved edge being provided with a flange, both flanges being positioned at the same side of the sheet and extending approximately perpendicularly to the sheet surface, the second straight edge and the second curved edge having no flange, the flange on the first straight edge ending at a distance from the second curved edge, while a substantially rectangular edge area adjacent this second curved edge begins at the end of the second curved edge joining the second straight edge and ends at a distance from the opposite end of the second curved edge, said edge area being progressively offset with respect to the adjacent portion of the sheet from its beginning to its end, the maximum distance over which this edge area is offset corresponding approximately to the thickness of the sheet, whilst a second substantially rectangular edge area adjacent the first curved edge begins at the end of the first curved edge joining the second straight edge and ends at a distance from the opposite end of the first curved edge, said second edge area being progressively offset from its beginning to its end with respect to the adjacent portion of the sheet, the maximum distance over which this second edge area is offset corresponding approximately to the thickness of the sheet.

3. A sheet according to claim 2, wherein said offset edge areas are offset in the same direction.

4. A sheet according to claim 2, wherein said offset edge areas are offset towards the side of the sheet, where said flanges extend.

5. A sheet according to claim 2, wherein said offset edge areas end approximately at the middle of the adjacent curved edge.

6. A sheet according to claim 2, wherein at least one of both offset edge areas ends before the middle of the adjacent curved edge.

7. A sheet according to claim 2, wherein at least one of both offset edge areas ends past the middle of the adjacent curved edge.

8. A sheet according to claim 2, wherein the flange on the first straight edge ends at a short distance from the first curved edge.

9. A sheet according to claim 2, wherein the flange on the first curved edge is provided with bolt holes near both its ends.

10. A substantially cylindrical silo having a wall which is constructed from a plurality of sheets, each sheet having a substantially rectangular periphery and being slightly cylindrically curved, each sheet comprising first and second straight edges opposite one another and first and second curved edges also opposite one another, each sheet being provided with rows of bolt holes adjacent the four edges, the first straight edge and the first curved edge being provided with a flange, both flanges being positioned at the same side of the sheet and extending approximately perpendicularly to the sheet surface, the second straight edge and the second curved edge having no flange, the flange on the first straight edge ending at a distance from the second curved edge, while a substantially rectangular edge area adjacent this second curved edge begins at the end of the second curved edge joining the second straight edge and ends at a distance from the opposite end of the second curved edge, said edge area being progressively offset with respect to the adjacent portion of the sheet from its beginning to its end, the maximum distance over which this edge area is offset corresponding approximately to the thickness of the sheet, whilst a second substantially rectangular edge area adjacent the first curved edge begins at the end of the first curved edge joining the second straight edge and ends at a distance from the opposite end of the first curved edge, said second edge area being progressively offset from its beginning to its end with respect to the adjacent portion of the sheet, the maximum distance over which this second edge area is offset corresponding approximately to the thickness of the sheet, the flange on the first straight edge ending at a short distance from the first curved edge and the flange on this first curved edge being provided with bolt holes near both its ends, the sheets being arranged in horizontal rings positioned one above the other, the first straight edge of one sheet overlapping the second straight edge of the adjacent sheet in each ring, while in successive rings the first curved edge of one sheet overlaps the second curved edge of the adjacent sheet.

11. A sheet for constructing the wall of a substantially cylindrical silo, which sheet has a substantially rectangular periphery and is slightly cylindrically curved, the sheet comprising first and second straight edges opposite one another and first and second curved edges also opposite one another, the sheet being provided with rows of bolt holes adjacent the four edges, the first straight edge and the first curved edge being provided with a flange, both flanges being positioned at the same side of the sheet and extending approximately perpendicularly to the sheet surface, the second straight edge and the second curved edge having no flange, the flange on the first straight edge ending at a distance from the second curved edge, a substantially rectangular edge area adjacent this second curved edge being offset with respect to the adjacent portion of the sheet over a distance corresponding approximately to the thickness of the sheet, said offset edge area beginning at a distance from the end of the second curved edge joining the second straight edge, while this edge area ends at a distance from the opposite end of the second curved edge.

12. A sheet according to claim 11, wherein said edge area is offset towards the side of the sheet, where said flanges extend.

13. A sheet according to claim 11, wherein said offset edge area ends approximately at the middle of the second curved edge.

14. A sheet according to claim 11, wherein said offset edge area ends before the middle of the second curved edge.

15. A sheet according to claim 11, wherein said offset edge area ends past the middle of the second curved edge.

16. A sheet according to claim 11, wherein a second substantially rectangular edge area adjacent the first curved edge extends along the whole length of this first curved edge and is offset in the same direction as the first mentioned offset edge area over a distance corresponding approximately to the thickness of the sheet.

17. A sheet according to claim 11, wherein the flange on the first straight edge ends at a short distance from the first curved edge.

18. A sheet according to claim 11, wherein the flange on the first curved edge is provided with bolt holes near both its ends.

19. A sheet for constructing the wall of a substantially cylindrical silo, which sheet has a substantially rectangular periphery and is slightly cylindrically curved, the sheet comprising first and second straight edges opposite one another and first and second curved edges also opposite one another, the sheet being provided with rows of bolt holes adjacent the four edges, the first straight edge and the first curved edge being provided with a flange, both flanges being positioned at the same side of the sheet and extending approximately perpendicular to the sheet surface, the second straight edge and the second curved edge having no flange, the flange on the first straight edge ending at a distance from the second curved edge, a substantially rectangular edge area adjacent this second curved edge being offset with respect to the adjacent portion of the sheet over a distance corresponding approximately to the thickness of the sheet, said offset edge area beginning at a distance from the end of the second curved edge joining the second straight edge, while this edge area ends at a distance from the opposite end of the second curved edge, a second substantially rectangular edge area adjacent the first curved edge extending along the whole length of this first curved edge and being offset in the same direction as the first mentioned offset edge area over a distance corresponding approximately to the thickness of the sheet, the flange on the first straight edge ending at a short distance from the first curved edge and the flange on the first curved edge being provided with bolt holes near both its ends.

20. A sheet according to claim 19, wherein the flange on the first straight edge is first bent outwardly approximately at right angles and is thereafter bent rearwardly approximately at right angles.

21. A sheet according to claim 11, wherein the first curved edge diverges with respect to the row of bolt holes adjacent the second curved edge to an extent that the distance between them at the second straight edge is larger by the thickness of the sheet than at the first straight edge.

22. A sheet for constructing the wall of a substantially cylindrical silo, which sheet has a substantially rectangular periphery and is slightly cylindrically curved, the sheet comprising first and second straight edges opposite one another and first and second curved edges also opposite one another, the sheet being provided with rows of bolt holes adjacent the four edges, the first straight edge and the first curved edge being provided with a flange, both flanges being positioned at the same side of the sheet and extending approximately perpendicularly to the sheet surface, the second straight edge and the second curved edge having no flange, the flange on the first straight edge ending at a distance from the second curved edge, while a substantially rectangular edge area adjacent this second curved edge begins at the end of the second curved edge joining the second straight edge and ends at a distance from the opposite end of the second curved edge, said edge area being progressively offset with respect to the adjacent portion of the sheet from its beginning to its end, the maximum distance over which this edge area is offset corresponding approximately to the thickness of the sheet, whilst a second substantially rectangular edge area adjacent the first curved edge begins at the end of the first curved edge joining the second straight edge and ends at a distance from the opposite end of the first curved edge, said second edge area being progressively offset from its beginning to its end with respect to the adjacent portion of the sheet, the maximum distance over which this second edge area is offset corresponding approximately to the thickness of the sheet, the flange on the first straight edge ending at a short distance from the first curved edge and the flange on this first curved edge being provided with bolt holes near both its ends.

23. A sheet according to claim 22, wherein the flange on the first straight edge is first bent outwardly approximately at right angles and is thereafter bent rearwardly approximately at right angles.

24. A sheet according to claim 2, wherein the first curved edge diverges with respect to the row of bolt holes adjacent the second curved edge to an extent that the distance between them at the second straight edge is larger by the thickness of the sheet than at the first straight edge.

* * * * *